United States Patent
Douady-Pleven et al.

(10) Patent No.: US 11,412,150 B2
(45) Date of Patent: Aug. 9, 2022

(54) ENTROPY MAXIMIZATION BASED AUTO-EXPOSURE

(71) Applicant: GoPro, Inc., San Mateo, CA (US)

(72) Inventors: Bruno César Douady-Pleven, Orsay (FR); Thomas Nicolas Emmanuel Veit, Meudon (FR); Guillaume Matthieu Guérin, Chatillon (FR)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/132,140

(22) Filed: Dec. 23, 2020

(65) Prior Publication Data

US 2021/0176388 A1     Jun. 10, 2021

Related U.S. Application Data

(63) Continuation of application No. PCT/US2019/039240, filed on Jun. 26, 2019.

(Continued)

(51) Int. Cl.
*H04N 5/235* (2006.01)
*G06T 5/00* (2006.01)
*H04N 5/232* (2006.01)

(52) U.S. Cl.
CPC ........... *H04N 5/2353* (2013.01); *G06T 5/001* (2013.01); *H04N 5/23258* (2013.01); *G06T 2207/10144* (2013.01)

(58) Field of Classification Search
None
See application file for complete search history.

(56) References Cited

U.S. PATENT DOCUMENTS 5,387,930 A *   2/1995   Toh ................. G06T 1/0007
                                      348/222.1
8,094,211 B2 *   1/2012   Kwon ................ H04N 5/2351
                                        348/229.1

(Continued)

FOREIGN PATENT DOCUMENTS

WO     2017069908 A1     4/2017

OTHER PUBLICATIONS

International Search Report for Application No. PCT/US2019/039240, dated Oct. 17, 2019, 16 pages.

(Continued)

*Primary Examiner* — James M Hannett
(74) *Attorney, Agent, or Firm* — Young Basile Hanlon & MacFarlane, P.C.

(57) ABSTRACT

An image capture apparatus may include an image sensor, a motion sensor, and an auto-exposure unit. The auto-exposure unit may obtain an input image captured during an exposure interval and corresponding motion data indicating motion of the image capture apparatus during the exposure interval. The auto-exposure unit may obtain image information-amount data for the input image. The auto-exposure unit may obtain derivative information-amount data based on the information-amount data and a candidate exposure adjustment. The auto-exposure unit may obtain an information-amount maximizing exposure interval based on the information-amount data and the derivative information-amount data. The image capture apparats may control the image sensor to obtain a subsequent input image signal representing a subsequent input image captured during the information-amount maximizing exposure interval, and output or store information representing the subsequent input image.

20 Claims, 6 Drawing Sheets

Related U.S. Application Data

(60) Provisional application No. 62/689,993, filed on Jun. 26, 2018.

(56) References Cited

U.S. PATENT DOCUMENTS

| | | | |
|---|---|---|---|
| 8,971,410 B2* | 3/2015 | Lee | H04N 19/51 375/240.16 |
| 9,729,870 B2* | 8/2017 | Zhai | H04N 19/162 |
| 9,894,285 B1 | 2/2018 | Chen | |
| 2011/0193990 A1 | 8/2011 | Pillman | |
| 2012/0050474 A1* | 3/2012 | Segall | H04N 19/85 348/43 |

OTHER PUBLICATIONS

Mohammad T. Rahman et al., "Using image entropy maximum for auto exposure", Journal of Electronic Imaging., vol. 20, No. 1, Jan. 1, 2011 (Jan. 1, 2011), p. 013007, XP055629888, US USSN: 1017-9909, DOI: 10.1117/1.3534855, 10 pages.

Richard Szeliski: "Image Alignment and Stitching: A Tutorial", Foundations and Trends in Computer Graphics and Vision, vol. 2, No. 1, Jan. 1, 2006(Jan. 1, 2006), pp. 1-104, XP055400792, US ISSN: 1572-2740, DOI: 10.1561/0600000009 section 6.2.

Roey Mechrez et al.: "Saliency Driven Image Manipulation", arxiv.org, Cornell University Library, 201 Olin Library Cornell University Ithaca, NY 14853, Dec. 7, 2016 (Dec. 7, 2016), XP081351731, section 1, 9 pages.

Samuel W Hasinoff et al: "Noise-optimal capture for high dynamic range photography", 2010 IEEE Conference on Computer Vision and Pattern Recognition (CVPR), Jun. 13-18, 2010, San Francisco, CA, USA, IEEE, Piscataway, NJ, USA, Jun. 13, 2010 (Jun. 13, 2010), pp. 553-560, XP031725992, ISBN: 978-1-4244-6984-0 abstract sections 2 and 4.2, 8 pages.

* cited by examiner

ENTROPY MAXIMIZATION BASED AUTO-EXPOSURE

CROSS REFERENCE TO RELATED APPLICATION(S)

This application is a continuation of International Application No. PCT/US2019/039240, filed on Jun. 26, 2019, which claims the benefit of U.S. Provisional Patent Application No. 62/689,993 filed on Jun. 26, 2018, both of which the contents are incorporated by reference herein.

TECHNICAL FIELD

This disclosure relates to digital image and video capture and processing, including auto-exposure, temporal and spatial image noise reduction, local motion compensation, spatially combining images, image distortion compensation, bitrate allocation, image alignment, prevention of highlight clipping, and reduction in lens flare.

BACKGROUND

Image capture devices, such as cameras, may capture content as images or video. Light may be received and focused via a lens and may be converted to an electronic image signal by an image sensor. The image signal may be processed by an image signal processor to form an image, which may be stored and/or encoded. In some implementations, entropy maximization based auto-exposure may be advantageous.

SUMMARY

The present disclosure satisfies the foregoing needs by providing, inter alia, apparatus and methods for image signal capture, processing, encoding, or a combination thereof.

An aspect of the disclosure relates to an apparatus for information-amount maximization based auto-exposure. An image capture apparatus may include an image sensor, a motion sensor, and an auto-exposure unit. The auto-exposure unit may be configured to obtain, from the image sensor, an input image signal representing an input image captured during an exposure interval. The auto-exposure unit may be configured to obtain, from the motion sensor, motion data indicating motion of the image capture apparatus during the exposure interval. The auto-exposure unit may be configured to obtain image information-amount data for the input image, wherein the image information-amount data is a sum of pixel information-amount data, wherein, for each pixel. The auto-exposure unit may be configured to obtain the pixel information-amount data by, in response to a determination that an input value for the pixel is a maximum pixel value, using zero as an information-amount value for the pixel. The auto-exposure unit may be configured to obtain the pixel information-amount data by, in response to a determination that the input value for the pixel is within the maximum pixel value, obtaining a signal level information-amount for the pixel as the base two logarithm of a signal-to-noise ratio for the pixel, wherein the signal-to-noise ratio is a ratio of the input value to a noise value for the pixel, and wherein the noise value for the pixel is modeled as a square root of a sum of a first defined value and a product of a second defined value and the input value of the pixel, and using a motion blur adjusted value for the pixel as the information-amount value for the pixel, wherein the motion blur adjusted value for the pixel is obtained based on the signal level information-amount for the pixel and the motion data. The auto-exposure unit may be configured to obtain derivative information-amount data based on the information-amount data and a candidate exposure adjustment. The auto-exposure unit may be configured to obtain an information-amount maximizing exposure interval based on the information-amount data and the derivative information-amount data. The image capture apparatus may be configured to control the image sensor to obtain a subsequent input image signal representing a subsequent input image captured during the information-amount maximizing exposure interval, and output or store information representing the subsequent input image.

Another aspect of the disclosure relates to an apparatus for information-amount maximization based auto-exposure. An image capture apparatus may include an image sensor configured to capture an input image in accordance with an exposure interval. The image capture apparatus may include a motion sensor configured to capture temporally corresponding motion data indicating motion of the image capture apparatus in accordance with the exposure interval. The image capture apparatus may include an auto-exposure unit. The auto-exposure unit may be configured to obtain, from the image sensor, an input image signal representing the input image. The auto-exposure unit may be configured to obtain, from the motion sensor, the temporally corresponding motion data. The auto-exposure unit may be configured to obtain image information-amount data for the input image based on the temporally corresponding motion data. The auto-exposure unit may be configured to obtain derivative information-amount data based on the information-amount data and a candidate exposure adjustment. The auto-exposure unit may be configured to obtain an information-amount maximizing exposure interval based on the information-amount data and the derivative information-amount data.

Another aspect of the disclosure relates to a method for information-amount maximization based auto-exposure by an auto-exposure unit of an image capture apparatus. Information-amount maximization based auto-exposure may include obtaining, from an image sensor of the image capture apparatus, an input image signal representing an input image captured in accordance with an exposure interval. Information-amount maximization based auto-exposure may include obtaining, from a motion sensor of the image capture apparatus, temporally corresponding motion data indicating motion of the image capture apparatus in accordance with the exposure interval. Information-amount maximization based auto-exposure may include obtaining image information-amount data for the input image based on the temporally corresponding motion data. Information-amount maximization based auto-exposure may include obtaining derivative information-amount data based on the information-amount data and a candidate exposure adjustment. Information-amount maximization based auto-exposure may include obtaining an information-amount maximizing exposure interval based on the information-amount data and the derivative information-amount data.

In the aspects described herein, the input image may include pixels. The auto-exposure unit may be configured to obtain pixel information-amount data for the pixels. The auto-exposure unit may be configured to obtain a sum of the pixel information-amount data as the image information-amount data. The auto-exposure unit may be configured to obtain the pixel information-amount data by, for each pixel from the pixels, determining a pixel information-amount value for the pixel based on a signal-to-noise ratio for the pixel, pixel saturation, and motion blur. The auto-exposure unit may be configured to determine the respective pixel information-amount value by, in response to a determination that an input value for the pixel is a maximum pixel value, using a defined value as the pixel information-amount value for the pixel.

The auto-exposure unit may be configured to determine the respective pixel information-amount value by, in response to a determination that the input value for the pixel is less than the maximum pixel value, obtaining a signal level information-amount for the pixel as the base two logarithm of a signal-to-noise ratio for the pixel, wherein the signal-to-noise ratio is a ratio of the input value to a noise value for the pixel, and wherein the noise value for the pixel is modeled as a square root of a sum of a first defined value and a product of a second defined value and the input value of the pixel, and using a motion blur adjusted value for the pixel as the pixel information-amount value for the pixel. The defined value is zero. The auto-exposure unit may be configured to obtain the motion blur adjusted value for the pixel by determining an amount of motion blur based on the temporally corresponding motion data, the exposure interval, and a size of the pixel, and using, as the motion blur adjusted value, a result of dividing the signal level information-amount by a sum of the size of the pixel and the amount of motion blur. The auto-exposure unit may be configured to obtain the pixel information-amount data by, for each pixel from the pixels, determining a pixel information-amount value for the pixel based on based on a histogram of the input image. The auto-exposure unit may be configured to obtain the pixel information-amount data by obtaining a saliency map indicating a relative importance of respective pixels within the input image. The auto-exposure unit may be configured to obtain the pixel information-amount data by, for each pixel from the pixels, determining a saliency adjusted information-amount by multiplying a saliency value from the saliency map for the pixel by the pixel information-amount value, and using the saliency adjusted information-amount as the pixel information-amount value. The auto-exposure unit may be configured to obtain the pixel information-amount data by, in response to a determination that a pixel is a saturated pixel along a stitch line for image merging, weighting the pixel to minimize saturated pixels along the stitch line. The image sensor may be configured to capture a second input image in accordance with the information-amount maximizing exposure interval.

The aspects described herein may include performing any combination of obtaining pixel information-amount data for the pixels; obtaining a sum of the pixel information-amount data as the image information-amount data; obtaining the pixel information-amount data by, for each pixel from the pixels, determining a respective pixel information-amount value for the pixel based on a signal-to-noise ratio for the pixel, pixel saturation, and motion blur; determining the respective pixel information-amount value by, in response to a determination that an input value for the pixel is a maximum pixel value, using a defined value as the pixel information-amount value for the pixel; determining the respective pixel information-amount value by, in response to a determination that the input value for the pixel is less than the maximum pixel value, obtaining a signal level information-amount for the pixel as the base two logarithm of a signal-to-noise ratio for the pixel, wherein the signal-to-noise ratio is a ratio of the input value to a noise value for the pixel, and wherein the noise value for the pixel is modeled as a square root of a sum of a first defined value and a product of a second defined value and the input value of the pixel, and using a motion blur adjusted value for the pixel as the pixel information-amount value for the pixel; obtaining the motion blur adjusted value for the pixel by determining an amount of motion blur based on the temporally corresponding motion data, the exposure interval, and a size of the pixel, and using, as the motion blur adjusted value, a result of dividing the signal level information-amount by a sum of the size of the pixel and the amount of motion blur; obtaining the pixel information-amount data by, for each pixel from the pixels, determining a pixel information-amount value for the pixel based on based on a histogram of the input image; obtaining the pixel information-amount data by obtaining a saliency map indicating a relative importance of respective pixels within the input image, and, for each pixel from the pixels, determining a saliency adjusted information-amount by multiplying a saliency value from the saliency map for the pixel by the pixel information-amount value, and using the saliency adjusted information-amount as the pixel information-amount value; obtaining the pixel information-amount data by, in response to a determination that a pixel is a saturated pixel along a stitch line for image merging, weighting the pixel to minimize saturated pixels along the stitch line; or obtaining, by the image sensor, a second input image signal representing a second input image in accordance with the information-amount maximizing exposure interval.

These and other objects, features, and characteristics of the apparatus, system, and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

All figures disclosed herein are © Copyright 2020 GoPro Inc. All rights reserved.

DETAILED DESCRIPTION

Implementations of the present technology will now be described in detail with reference to the drawings, which are provided as examples so as to enable those skilled in the art to practice the technology. The figures and examples are not meant to limit the scope of the present disclosure to a single implementation or embodiment, and other implementations and embodiments are possible by way of interchange of, or combination with, some or all of the described or illustrated elements. Wherever convenient, the same reference numbers will be used throughout the drawings to refer to same or like parts.

Content, such as visual content, may be captured as one or more images or video frames by one or more image capture devices, such as a camera or camera array. An image capture device may include one or more lenses, image sensors, image signal processors, encoders, or combinations thereof. A lens may receive and focus light on an image sensor or sensors. An image sensor or sensors may sample the light and generate an electronic image signal. An image analysis unit may receive the image signal from one or more image sensors and may analyze the image signal to obtain image analysis information. An image signal processor (ISP) may receive the image signal from one or more image sensors and may process the image signal to generate one or more processed images, pictures, or frames, such as based on the image analysis information.

The quality of a captured image is affected by exposure interval. Images captured using a relatively short exposure interval, such as one millisecond, may include noise, such as input noise and quantization noise. Increasing exposure interval may reduce noise and improve the captured image quality. Images captured using a relatively long exposure interval, such as one second, may be saturated, or may include saturated pixels, and may include motion blur. Decreasing exposure interval may reduce saturation and motion blur and improve image quality. In some image capture devices, an auto-exposure unit automatically adjusts exposure interval to improve image quality based on a defined average value, such as 12.5%, which may be sub-optimal for some images.

Figure 1:
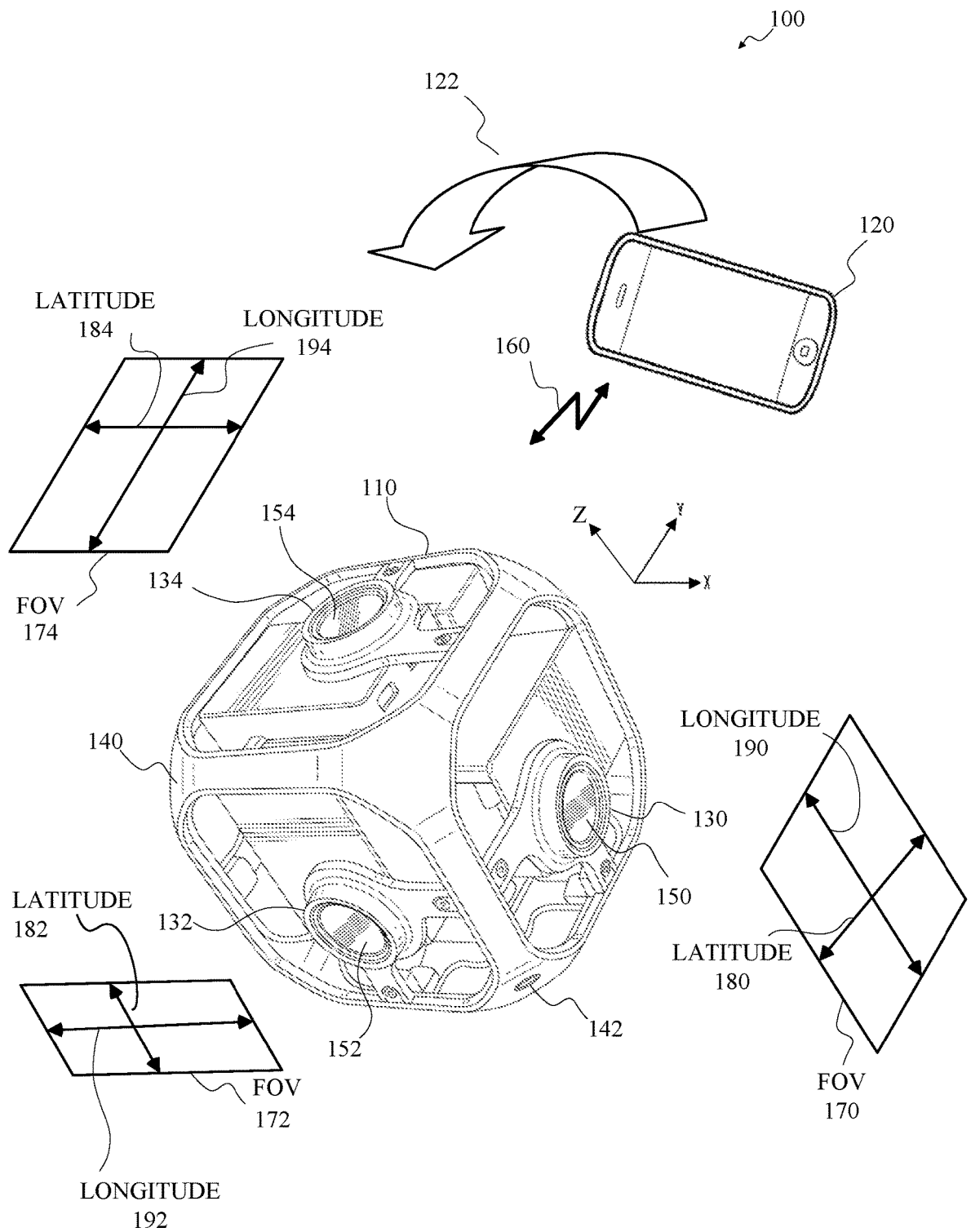
FIG. 1 is a diagram of an example of an image capture system for content capture in accordance with implementations of this disclosure.

FIG. 1 is a diagram of an example of an image capture system 100 for content capture in accordance with implementations of this disclosure. The image capture system 100 shown in FIG. 1 includes an image capture apparatus 110 and an external user interface (UI) device 120. Other configurations of the image capture system 100 may be used. For example, the external user interface device 120 may be omitted.

The image capture apparatus 110 shown in FIG. 1 is a multi-face apparatus, which includes multiple image capture devices 130, 132, 134, arranged in a structure 140, such as a cube-shaped cage as shown. Although three image capture devices 130, 132, 134 are shown for simplicity in FIG. 1, the image capture apparatus 110 may include any number of image capture devices. For example, the image capture apparatus 110 shown in FIG. 1 may include six cameras, which may include the three image capture devices 130, 132, 134 shown and three cameras not shown.

The structure 140 may have dimensions, such as between 25 mm and 150 mm. For example, the length of the sides of the structure 140 may be 105 mm. The structure 140 may include a mounting port 142, which may be removably attachable to a supporting structure, such as a tripod, a photo stick, or any other camera mount (not shown). The structure 140 may be a rigid support structure, such that the relative orientation of the image capture devices 130, 132, 134 of the image capture apparatus 110 may be maintained in relatively static or fixed alignment, except as described herein.

The image capture apparatus 110 may obtain, or capture, image content, such as images, video, or both, with a 360° field-of-view, which may be referred to herein as panoramic or spherical content. For example, respective image capture devices 130, 132, 134 may include respective lenses, for receiving and focusing light, and respective image sensors for converting the received and focused light to an image signal, such as by measuring or sampling the light, and the multiple image capture devices 130, 132, 134 may be arranged such that respective image sensors and lenses capture a combined field-of-view characterized by a spherical or near spherical field-of-view.

Each respective image capture device 130, 132, 134 may have a respective field-of-view 170, 172, 174, such as a field-of-view 170, 172, 174 that 90° in a lateral, or latitudinal, dimension 180, 182, 184 and includes 120° in a longitudinal dimension 190, 192, 194. In some implementations, image capture devices 130, 132, 134 having overlapping fields-of-view 170, 172, 174, or the image sensors thereof, may be oriented at defined angles, such as at 90°, with respect to one another. In some implementations, the image sensor of the image capture device 130 is directed along the X axis, the image sensor of the image capture device 132 is directed along the Y axis, and the image sensor of the image capture device 134 is directed along the Z axis. The respective fields-of-view 170, 172, 174 for adjacent image capture devices 130, 132, 134 may be oriented to allow overlap for a stitching function. For example, the longitudinal dimension 190 of the field-of-view 170 for the image capture device 130 may be oriented at 90° with respect to the lateral dimension 184 of the field-of-view 174 for the image capture device 134, the lateral dimension 180 of the field-of-view 170 for the image capture device 130 may be oriented at 90° with respect to the longitudinal dimension 192 of the field-of-view 172 for the image capture device 132, and the lateral dimension 182 of the field-of-view 172 for the image capture device 132 may be oriented at 90° with respect to the longitudinal dimension 194 of the field-of-view 174 for the image capture device 134.

The image capture apparatus 110 shown in FIG. 1 may have 420° angular coverage in vertical and/or horizontal planes by the successive overlap of 90°, 120°, 90°, 120° respective fields-of-view 170, 172, 174 (not all shown) for four adjacent image capture devices 130, 132, 134 (not all shown). For example, fields-of-view 170, 172 for the image capture devices 130, 132 and fields-of-view (not shown) for two image capture devices (not shown) opposite the image capture devices 130, 132 respectively may be combined to provide 420° angular coverage in a horizontal plane. In some implementations, the overlap between fields-of-view of image capture devices 130, 132, 134 having a combined field-of-view including less than 360° angular coverage in a vertical and/or horizontal plane may be aligned and merged or combined to produce a panoramic image. For example, the image capture apparatus 110 may be in motion, such as rotating, and source images captured by at least one of the image capture devices 130, 132, 134 may be combined to form a panoramic image. As another example, the image capture apparatus 110 may be stationary, and source images captured contemporaneously by respective image capture device 130, 132, 134 may be combined to form a panoramic image.

An image capture device 130, 132, 134 may include a lens 150, 152, 154 or another optical element. An optical element may include one or more lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical element. In some implementations, a lens 150, 152, 154 may be a fisheye lens and produce fisheye, or near-fisheye, field-of-view images. For example, the respective lenses 150, 152, 154 of the image capture devices 130, 132, 134 may be fisheye lenses. In some implementations, images captured by two or more image capture devices 130, 132, 134 of the image capture apparatus 110 may be combined by stitching or merging fisheye projections of the captured images to produce an equirectangular planar image. For example, a first fisheye image may be a round or elliptical image, and may be transformed to a first rectangular image, a second fisheye image may be a round or elliptical image, and may be transformed to a second rectangular image, and the first and second rectangular images may be arranged side-by-side, which may include overlapping, and stitched together to form the equirectangular planar image.

Although not expressly shown in FIG. 1, an image capture device 130, 132, 134 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIG. 1, an image capture apparatus 110 may include one or more microphones, which may receive, capture, and record audio information, which may be associated with images acquired by the image sensors.

Although not expressly shown in FIG. 1, the image capture apparatus 110 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

The image capture apparatus 110 may interface with or communicate with an external device, such as the external user interface (UI) device 120, via a wired (not shown) or wireless (as shown) computing communication link 160. Although a single computing communication link 160 is shown in FIG. 1 for simplicity, any number of computing communication links may be used. Although the computing communication link 160 shown in FIG. 1 is shown as a direct computing communication link, an indirect computing communication link, such as a link including another device or a network, such as the internet, may be used. In some implementations, the computing communication link 160 may be a Wi-Fi link, an infrared link, a Bluetooth (BT) link, a cellular link, a ZigBee link, a near field communications (NFC) link, such as an ISO/IEC 23243 protocol link, an Advanced Network Technology interoperability (ANT+) link, and/or any other wireless communications link or combination of links. In some implementations, the computing communication link 160 may be a High-Definition Multimedia Interface (HDMI) link, a Universal Serial Bus (USB) link, a digital video interface link, a display port interface link, such as a Video Electronics Standards Association (VESA) digital display interface link, an Ethernet link, a Thunderbolt link, and/or other wired computing communication link.

The user interface device 120 may be a computing device, such as a smartphone, a tablet computer, a phablet, a smart watch, a portable computer, and/or another device or combination of devices configured to receive user input, communicate information with the image capture apparatus 110 via the computing communication link 160, or receive user input and communicate information with the image capture apparatus 110 via the computing communication link 160.

The image capture apparatus 110 may transmit images, such as panoramic images, or portions thereof, to the user interface device 120 via the computing communication link 160, and the user interface device 120 may store, process, display, or a combination thereof the panoramic images.

The user interface device 120 may display, or otherwise present, content, such as images or video, acquired by the image capture apparatus 110. For example, a display of the user interface device 120 may be a viewport into the three-dimensional space represented by the panoramic images or video captured or created by the image capture apparatus 110.

The user interface device 120 may communicate information, such as metadata, to the image capture apparatus 110. For example, the user interface device 120 may send orientation information of the user interface device 120 with respect to a defined coordinate system to the image capture apparatus 110, such that the image capture apparatus 110 may determine an orientation of the user interface device 120 relative to the image capture apparatus 110. Based on the determined orientation, the image capture apparatus 110 may identify a portion of the panoramic images or video captured by the image capture apparatus 110 for the image capture apparatus 110 to send to the user interface device 120 for presentation as the viewport. In some implementations, based on the determined orientation, the image capture apparatus 110 may determine the location of the user interface device 120 and/or the dimensions for viewing of a portion of the panoramic images or video.

In an example, a user may rotate, or sweep, the user interface device 120 through an arc or path 122 in space, as indicated by the arrow shown at 122 in FIG. 1. The user interface device 120 may communicate display orientation information to the image capture apparatus 110 using a communication interface such as the computing communication link 160. The image capture apparatus 110 may provide an encoded bitstream to enable viewing of a portion of the panoramic content corresponding to a portion of the environment of the display location as the image capture apparatus 110 traverses the path 122. Accordingly, display orientation information from the user interface device 120 may be transmitted to the image capture apparatus 110 to control user selectable viewing of captured images and/or video.

The image capture apparatus 110 may communicate with one or more other external devices (not shown) via wired or wireless computing communication links (not shown).

Data, such as image data, audio data, and/or other data, obtained by the image capture apparatus 110 may be incorporated into a combined multimedia stream. For example, the multimedia stream may include a video track and/or an audio track. As another example, information from various metadata sensors and/or sources within and/or coupled to the image capture apparatus 110 may be processed to produce a metadata track associated with the video and/or audio track. The metadata track may include metadata, such as white balance metadata, image sensor gain metadata, sensor temperature metadata, exposure interval metadata, lens aperture metadata, bracketing configuration metadata and/or other parameters. In some implementations, a multiplexed stream may be generated to incorporate a video and/or audio track and one or more metadata tracks.

The user interface device 120 may implement or execute one or more applications, such as GoPro Studio, the GoPro App, or both, to manage or control the image capture apparatus 110. For example, the user interface device 120 may include an application for controlling camera configuration, video acquisition, video display, or any other configurable or controllable aspect of the image capture apparatus 110.

The user interface device 120, such as via an application, such as the GoPro App, may generate and share, such as via a cloud-based or social media service, one or more images, or short video clips, such as in response to user input.

The user interface device 120, such as via an application, such as the GoPro App, may remotely control the image capture apparatus 110, such as in response to user input.

The user interface device 120, such as via an application, such as the GoPro App, may display unprocessed or minimally processed images or video captured by the image capture apparatus 110 contemporaneously with capturing the images or video by the image capture apparatus 110, such as for shot framing, which may be referred to herein as a live preview, and which may be performed in response to user input.

The user interface device 120, such as via an application, such as the GoPro App, may mark one or more key moments contemporaneously with capturing the images or video by the image capture apparatus 110, such as with a HiLight Tag, such as in response to user input.

The user interface device 120, such as via an application, such as the GoPro App, may display, or otherwise present, marks or tags associated with images or video, such as HiLight Tags, such as in response to user input. For example, marks may be presented in a GoPro Camera Roll application for location review and/or playback of video highlights.

The user interface device 120, such as via an application, such as the GoPro App, may wirelessly control camera software, hardware, or both. For example, the user interface device 120 may include a web-based graphical interface accessible by a user for selecting a live or previously recorded video stream from the image capture apparatus 110 for display on the user interface device 120.

The user interface device 120 may receive information indicating a user setting, such as an image resolution setting, such as 3840 pixels by 2160 pixels, a frame rate setting, such as sixty frames per second (fps), a location setting, and/or a context setting, which may indicate an activity, such as mountain biking, in response to user input, and may communicate the settings, or related information, to the image capture apparatus 110.

Figure 2:
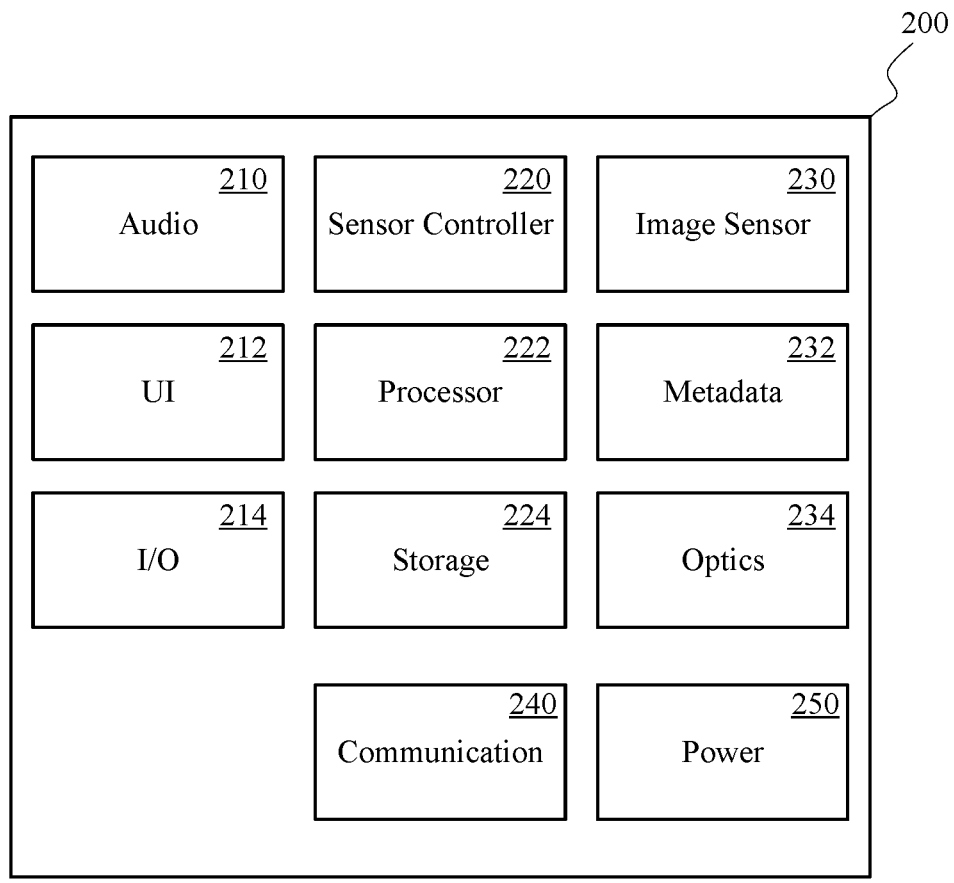
FIG. 2 is a block diagram of an example of an image capture device in accordance with implementations of this disclosure.

FIG. 2 is a block diagram of an example of an image capture device 200 in accordance with implementations of this disclosure. The image capture device 200, which may be one of the image capture devices 130, 132, 134 shown in FIG. 1, such as an action camera, shown in FIG. 2 includes an audio component 210, a user interface (UI) unit 212, an input/output (I/O) unit 214, a sensor controller 220, a processor 222, an electronic storage unit 224, an image sensor 230, a metadata unit 232, an optics unit 234, a communication unit 240, and a power system 250. Other configurations of the image capture device 200 may be used. For example, the user interface unit 212 may be omitted.

The audio component 210, which may include a microphone, may receive, sample, capture, record, or a combination thereof audio information, such as sound waves, which may be associated with, such as stored in association with, image or video content contemporaneously captured by the image capture device 200. In some implementations, audio information may be encoded using, for example, Advanced Audio Coding (AAC), Audio Compression-3 (AC3), Moving Picture Experts Group Layer-3 Audio (MP3), linear Pulse Code Modulation (PCM), Motion Picture Experts Group-High efficiency coding and media delivery in heterogeneous environments (MPEG-H), and/or other audio coding formats or codecs. In one or more implementations of spherical video and/or audio, the audio codec may include a three-dimensional audio codec, such as Ambisonics. For example, an Ambisonics codec can produce full surround audio including a height dimension. Using a G-format Ambisonics codec, a special decoder may be omitted.

The user interface unit 212 may include one or more units that may register or receive input from and/or present outputs to a user, such as a display, a touch interface, a proximity sensitive interface, a light receiving/emitting unit, a sound receiving/emitting unit, a wired/wireless unit, and/or other units. In some implementations, the user interface unit 212 may include a display, one or more tactile elements, such as buttons and/or virtual touch screen buttons, lights (LEDs), speakers, and/or other user interface elements. The user interface unit 212 may receive user input and/or provide information to a user related to the operation of the image capture device 200.

The user interface unit 212 may include a display unit that presents information related to camera control or use, such as operation mode information, which may include image resolution information, frame rate information, capture mode information, sensor mode information, video mode information, photo mode information, or a combination thereof, connection status information, such as connected, wireless, wired, or a combination thereof, power mode information, such as standby mode information, sensor mode information, video mode information, or a combination thereof, information related to other information sources, such as heart rate information, global positioning system information, or a combination thereof, and/or other information.

The user interface unit 212 may include a user interface component such as one or more buttons, which may be operated, such as by a user, to control camera operations, such as to start, stop, pause, and/or resume sensor and/or content capture. The camera control associated with respective user interface operations may be defined. For example, the camera control associated with respective user interface operations may be defined based on the duration of a button press, which may be pulse width modulation, a number of button presses, which may be pulse code modulation, or a combination thereof. In an example, a sensor acquisition mode may be initiated in response to detecting two short button presses. In another example, the initiation of a video mode and cessation of a photo mode, or the initiation of a photo mode and cessation of a video mode, may be triggered or toggled in response to a single short button press. In another example, video or photo capture for a given time duration or a number of frames, such as burst capture, may be triggered in response to a single short button press. Other user command or communication implementations may also be implemented, such as one or more short or long button presses.

The I/O unit 214 may synchronize the image capture device 200 with other cameras and/or with other external devices, such as a remote control, a second image capture device, a smartphone, a user interface device, such as the user interface device 120 shown in FIG. 1, and/or a video server. The I/O unit 214 may communicate information between I/O components.

In some implementations, the I/O unit 214 may be connected to the communication unit 240 to provide a wired and/or wireless communications interface, such as a Wi-Fi interface, a Bluetooth interface, a USB interface, an HDMI interface, a Wireless USB interface, a Near Field Communication (NFC) interface, an Ethernet interface, a radio frequency transceiver interface, and/or other interfaces, for communication with one or more external devices, such as a user interface device, such as the user interface device 120 shown in FIG. 1, or another metadata source. In some implementations, the I/O unit 214 may interface with LED lights, a display, a button, a microphone, speakers, and/or other I/O components. In some implementations, the I/O unit 214 may interface with an energy source, such as a battery, and/or a Direct Current (DC) electrical source.

The I/O unit 214 of the image capture device 200 may include one or more connections to external computerized devices for configuration and/or management of remote devices, as described herein. The I/O unit 214 may include any of the wireless or wireline interfaces described herein, and/or may include customized or proprietary connections for specific applications.

The sensor controller 220 may operate or control the image sensor 230, such as in response to input, such as user input. In some implementations, the sensor controller 220 may receive image and/or video input from the image sensor 230 and may receive audio information from the audio component 210.

The processor 222 may include a system on a chip (SOC), microcontroller, microprocessor, central processing unit (CPU), digital signal processor (DSP), application-specific integrated circuit (ASIC), graphics processing unit (GPU), and/or other processor that may control the operation and functionality of the image capture device 200. In some implementations, the processor 222 may interface with the sensor controller 220 to obtain and process sensory information, such as for object detection, face tracking, stereo vision, and/or other image processing.

The sensor controller 220, the processor 222, or both may synchronize information received by the image capture device 200. For example, timing information may be associated with received sensor data, and metadata information may be related to content, such as images or videos, captured by the image sensor 230 based on the timing information. In some implementations, the metadata capture may be decoupled from video/image capture. For example, metadata may be stored before, after, and in-between the capture, processing, or storage of one or more video clips and/or images.

The sensor controller 220, the processor 222, or both may evaluate or process received metadata and may generate other metadata information. For example, the sensor controller 220 may integrate the received acceleration information to determine a velocity profile for the image capture device 200 concurrent with recording a video. In some implementations, video information may include multiple frames of pixels and may be encoded using an encoding method, such as H.264, H.265, CineForm and/or other codecs.

Although not shown separately in FIG. 2, one or more of the audio component 210, the user interface unit 212, the I/O unit 214, the sensor controller 220, the processor 222, the electronic storage unit 224, the image sensor 230, the metadata unit 232, the optics unit 234, the communication unit 240, or the power systems 250 of the image capture device 200 may communicate information, power, or both with one or more other units, such as via an electronic communication pathway, such as a system bus. For example, the processor 222 may interface with the audio component 210, the user interface unit 212, the I/O unit 214, the sensor controller 220, the electronic storage unit 224, the image sensor 230, the metadata unit 232, the optics unit 234, the communication unit 240, or the power systems 250 via one or more driver interfaces and/or software abstraction layers. In some implementations, one or more of the units shown in FIG. 2 may include a dedicated processing unit, memory unit, or both (not shown). In some implementations, one or more components may be operable by one or more other control processes. For example, a global positioning system receiver may include a processing apparatus that may provide position and/or motion information to the processor 222 in accordance with a defined schedule, such as values of latitude, longitude, and elevation at 10 Hz.

The electronic storage unit 224 may include a system memory module that may store executable computer instructions that, when executed by the processor 222, perform various functionalities including those described herein. For example, the electronic storage unit 224 may be a non-transitory computer-readable storage medium, which may include executable instructions, and a processor, such as the processor 222 may execute the instruction to perform one or more, or portions of one or more, of the operations described herein. The electronic storage unit 224 may include storage memory for storing content, such as metadata, images, audio, or a combination thereof, captured by the image capture device 200.

The electronic storage unit 224 may include non-transitory memory for storing configuration information and/or processing code for video information and metadata capture, and/or to produce a multimedia stream that may include video information and metadata in accordance with the present disclosure. In some implementations, the configuration information may include capture type, such as video or still image, image resolution, frame rate, burst setting, white balance, recording configuration, such as loop mode, audio track configuration, and/or other parameters that may be associated with audio, video, and/or metadata capture. In some implementations, the electronic storage unit 224 may include memory that may be used by other hardware/firmware/software elements of the image capture device 200.

The image sensor 230 may include one or more of a charge-coupled device sensor, an active pixel sensor, a complementary metal-oxide semiconductor sensor, an N-type metal-oxide-semiconductor sensor, and/or another image sensor or combination of image sensors. In some implementations, the image sensor 230 may be controlled based on control signals from a sensor controller 220.

The image sensor 230 may sense or sample light waves gathered by the optics unit 234 and may produce image data or signals. The image sensor 230 may generate an output signal conveying visual information regarding the objects or other content corresponding to the light waves received by the optics unit 234. The visual information may include one or more of an image, a video, and/or other visual information.

The image sensor 230 may include a video sensor, an acoustic sensor, a capacitive sensor, a radio sensor, a vibrational sensor, an ultrasonic sensor, an infrared sensor, a radar sensor, a Light Detection And Ranging (LIDAR) sensor, a sonar sensor, or any other sensory unit or combination of sensory units capable of detecting or determining information in a computing environment.

The metadata unit 232 may include sensors such as an inertial measurement unit, which may include one or more accelerometers, one or more gyroscopes, a magnetometer, a compass, a global positioning system sensor, an altimeter, an ambient light sensor, a temperature sensor, and/or other sensors or combinations of sensors. In some implementations, the image capture device 200 may contain one or more other sources of metadata information, telemetry, or both, such as image sensor parameters, battery monitor, storage parameters, and/or other information related to camera operation and/or capture of content. The metadata unit 232 may obtain information related to the environment of the image capture device 200 and aspects in which the content is captured.

For example, the metadata unit 232 may include an accelerometer that may provide device motion information including velocity and/or acceleration vectors representative of motion of the image capture device 200. In another example, the metadata unit 232 may include a gyroscope that may provide orientation information describing the orientation of the image capture device 200. In another example, the metadata unit 232 may include a global positioning system sensor that may provide global positioning system coordinates, time, and information identifying a location of the image capture device 200. In another example, the metadata unit 232 may include an altimeter that may obtain information indicating an altitude of the image capture device 200.

The metadata unit 232, or one or more portions thereof, may be rigidly coupled to the image capture device 200 such that motion, changes in orientation, or changes in the location of the image capture device 200 may be accurately detected by the metadata unit 232. Although shown as a single unit, the metadata unit 232, or one or more portions thereof, may be implemented as multiple distinct units. For example, the metadata unit 232 may include a temperature sensor as a first physical unit and a global positioning system unit as a second physical unit. In some implementations, the metadata unit 232, or one or more portions thereof, may be included in an image capture device 200 as shown or may be included in a physically separate unit operatively coupled to, such as in communication with, the image capture device 200.

The optics unit 234 may include one or more of a lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optics component. In some implementations, the optics unit 234 may include a focus controller unit that may control the operation and configuration of the camera lens. The optics unit 234 may receive light from an object and may focus received light onto an image sensor 230. Although not shown separately in FIG. 2, in some implementations, the optics unit 234 and the image sensor 230 may be combined, such as in a combined physical unit, such as a housing.

The communication unit 240 may be coupled to the I/O unit 214 and may include a component, such as a dongle, having an infrared sensor, a radio frequency transceiver and antenna, an ultrasonic transducer, and/or other communications interfaces used to send and receive wireless communication signals. In some implementations, the communication unit 240 may include a local, such as Bluetooth or Wi-Fi, and/or broad range, such as cellular LTE, communications interface for communication between the image capture device 200 and a remote device, such as the user interface device 120 in FIG. 1. The communication unit 240 may communicate using, for example, Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. In some implementations, the communication unit 240 may communicate using networking protocols, such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged via the communication unit 240 may be represented using formats including one or more of hypertext markup language (HTML), extensible markup language (XML), and/or other formats. One or more exchanges of information between the image capture device 200 and remote or external devices may be encrypted using encryption technologies including one or more of secure sockets layer (SSL), transport layer security (TLS), virtual private networks (VPNs), Internet Protocol security (IPsec), and/or other encryption technologies.

The one or more power systems 250 supply power to the image capture device 200. For example, for a small-sized, lower-power action camera a wireless power solution, such as battery, solar cell, inductive, such as contactless, power source, rectification, and/or other power supply, may be used.

Consistent with the present disclosure, the components of the image capture device 200 may be remote from one another and/or aggregated. For example, one or more sensor components may be distal from the image capture device 200, such as shown and described with respect to FIG. 1. Multiple mechanical, sensory, or electrical units may be controlled by a learning apparatus via network/radio connectivity.

Figure 3:
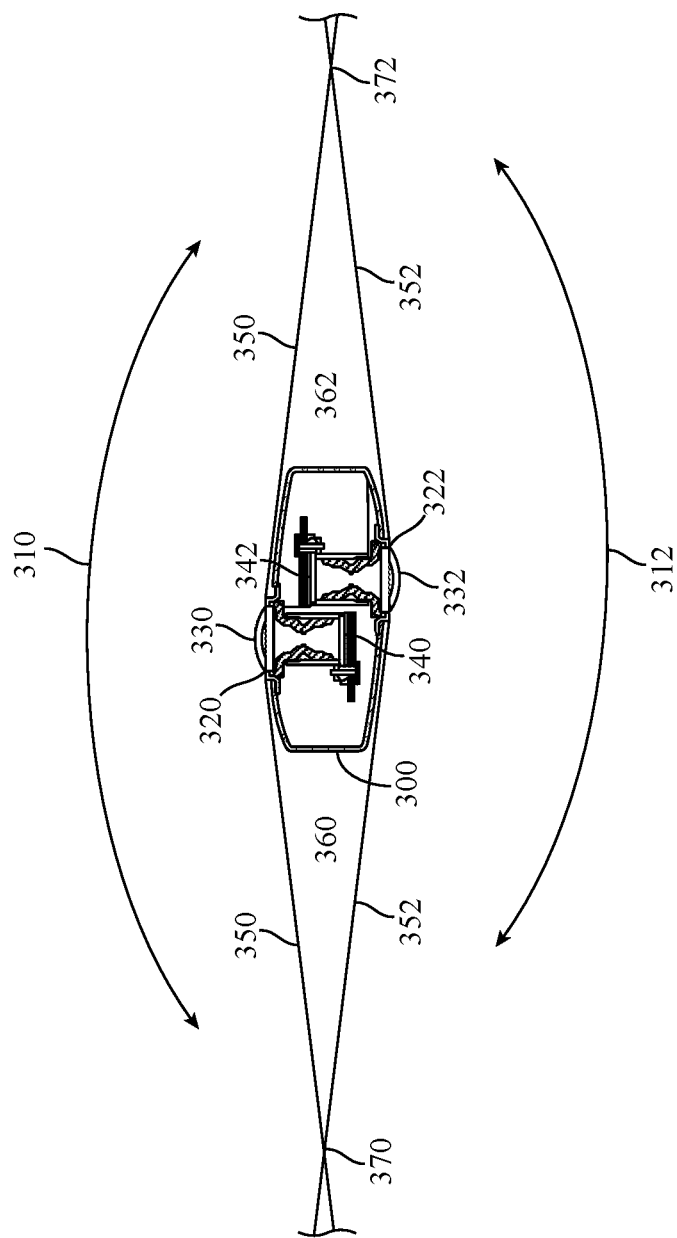
FIG. 3 is a cross-sectional view of an example of an image capture apparatus including overlapping fields-of-view in accordance with implementations of this disclosure.

FIG. 3 is a cross-sectional view of an example of a dual-lens image capture apparatus 300 including overlapping fields-of-view 310, 312 in accordance with implementations of this disclosure. In some implementations, the image capture apparatus 300 may be a spherical image capture apparatus with fields-of-view 310, 312 as shown in FIG. 3. For example, the image capture apparatus 300 may include image capture devices 320, 322, related components, or a combination thereof, arranged in a back-to-back or Janus configuration. For example, a first image capture device 320 may include a first lens 330 and a first image sensor 340, and a second image capture device 322 may include a second lens 332 and a second image sensor 342 arranged oppositely from the first lens 330 and the first image sensor 340.

The first lens 330 of the image capture apparatus 300 may have the field-of-view 310 shown above a boundary 350. Behind the first lens 330, the first image sensor 340 may capture a first hyper-hemispherical image plane from light entering the first lens 330, corresponding to the first field-of-view 310.

The second lens 332 of the image capture apparatus 300 may have a field-of-view 312 as shown below a boundary 352. Behind the second lens 332, the second image sensor 342 may capture a second hyper-hemispherical image plane from light entering the second lens 332, corresponding to the second field-of-view 312.

One or more areas, such as blind spots 360, 362, may be outside of the fields-of-view 310, 312 of the lenses 330, 332, light may be obscured from the lenses 330, 332 and the corresponding image sensors 340, 342, and content in the blind spots 360, 362 may be omitted from capture. In some implementations, the image capture apparatus 300 may be configured to minimize the blind spots 360, 362.

The fields-of-view 310, 312 may overlap. Stitch points 370, 372, proximal to the image capture apparatus 300, at which the fields-of-view 310, 312 overlap may be referred to herein as overlap points or stitch points. Content captured by the respective lenses 330, 332, distal to the stitch points 370, 372, may overlap.

Images contemporaneously captured by the respective image sensors 340, 342 may be combined to form a combined image. Combining the respective images may include correlating the overlapping regions captured by the respective image sensors 340, 342, aligning the captured fields-of-view 310, 312, and stitching the images together to form a cohesive combined image.

A small change in the alignment, such as position and/or tilt, of the lenses 330, 332, the image sensors 340, 342, or both may change the relative positions of their respective fields-of-view 310, 312 and the locations of the stitch points 370, 372. A change in alignment may affect the size of the blind spots 360, 362, which may include changing the size of the blind spots 360, 362 unequally.

Incomplete or inaccurate information indicating the alignment of the image capture devices 320, 322, such as the locations of the stitch points 370, 372, may decrease the accuracy, efficiency, or both of generating a combined image. In some implementations, the image capture apparatus 300 may maintain information indicating the location and orientation of the lenses 330, 332 and the image sensors 340, 342 such that the fields-of-view 310, 312, stitch points 370, 372, or both may be accurately determined, which may improve the accuracy, efficiency, or both of generating a combined image.

Optical axes through the lenses 330, 332 may be substantially antiparallel to each other, such that the respective axes may be within a tolerance such as 1%, 3%, 5%, 10%, and/or other tolerances. In some implementations, the image sensors 340, 342 may be substantially perpendicular to the optical axes through their respective lenses 330, 332, such that the image sensors may be perpendicular to the respective axes to within a tolerance such as 1%, 3%, 5%, 10%, and/or other tolerances.

The lenses 330, 332 may be laterally offset from each other, may be off-center from a central axis of the image capture apparatus 300, or may be laterally offset and off-center from the central axis. As compared to an image capture apparatus with back-to-back lenses, such as lenses aligned along the same axis, the image capture apparatus 300 including laterally offset lenses 330, 332 may include substantially reduced thickness relative to the lengths of the lens barrels securing the lenses 330, 332. For example, the overall thickness of the image capture apparatus 300 may be close to the length of a single lens barrel as opposed to twice the length of a single lens barrel as in a back-to-back configuration. Reducing the lateral distance between the lenses 330, 332 may improve the overlap in the fields-of-view 310, 312.

Images or frames captured by an image capture apparatus, such as the image capture apparatus 110 shown in FIG. 1 or the image capture apparatus 300 shown in FIG. 3, may be combined, merged, or stitched together, to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

Figure 4:
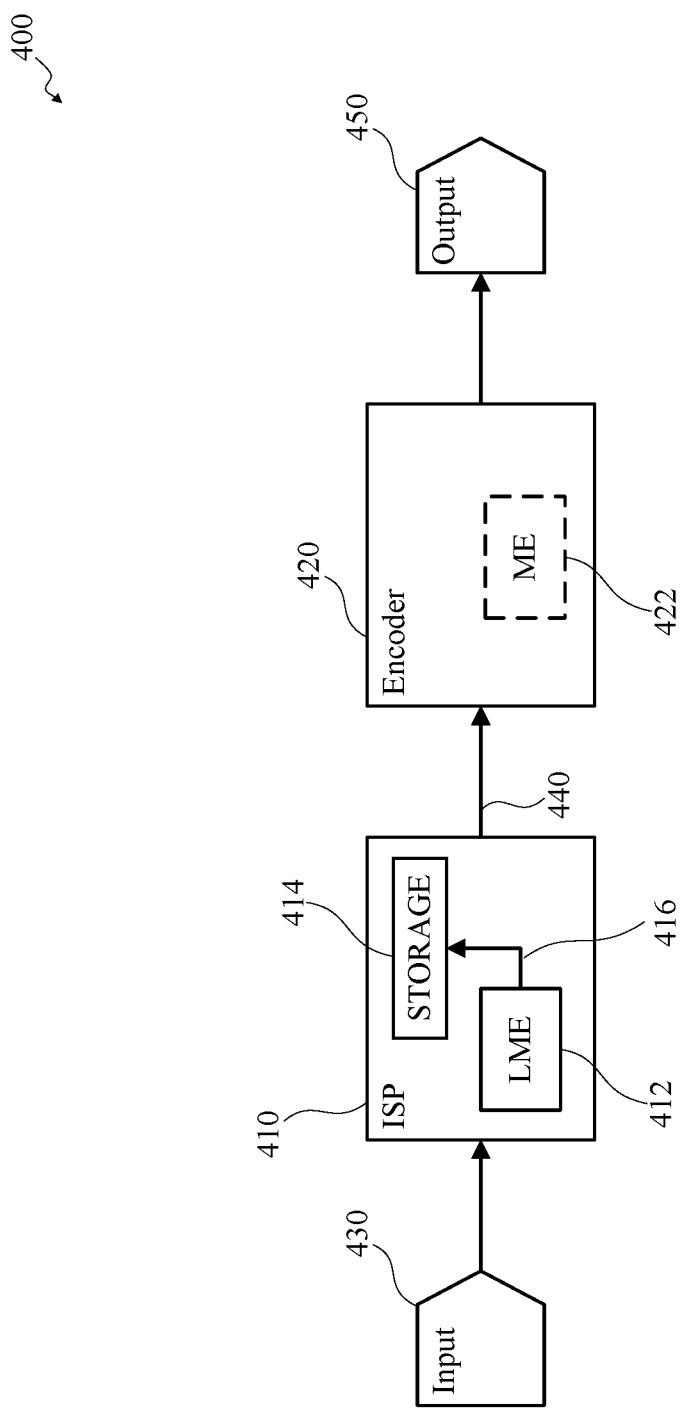
FIG. 4 is a block diagram of an example of an image processing and coding pipeline in accordance with implementations of this disclosure.

FIG. 4 is a block diagram of an example of an image processing and coding pipeline 400 in accordance with implementations of this disclosure. In some implementations, the image processing and coding pipeline 400 may be included in an image capture device, such as the image capture device 200 shown in FIG. 2, or an image capture apparatus, such as the image capture apparatus 110 shown in FIG. 1 or the image capture apparatus 300 shown in FIG. 3. In some implementations, the image processing and coding pipeline 400 may include an image signal processor (ISP) 410, an encoder 420, or a combination thereof.

The image signal processor 410 may receive an input image signal 430. For example, an image sensor (not shown), such as image sensor 230 shown in FIG. 2, may capture an image, or a portion thereof, and may send, or transmit, the captured image, or image portion, to the image signal processor 410 as the input image signal 430. In some implementations, an image, or frame, such as an image, or frame, included in the input image signal, may be one of a sequence or series of images or frames of a video, such as a sequence, or series, of frames captured at a rate, or frame rate, which may be a number or cardinality of frames captured per defined temporal period, such as twenty-four, thirty, or sixty frames per second.

The image signal processor 410 may include a local motion estimation (LME) unit 412, which may generate local motion estimation information for use in image signal processing and encoding, such as in correcting distortion, stitching, and/or motion compensation. In some implementations, the local motion estimation unit 412 may partition the input image signal 430 into blocks, such as having 4×4, 16×16, 64×64, and/or other dimensions. In some implementations, the local motion estimation unit 412 may partition the input image signal 430 into arbitrarily shaped patches and/or individual pixels.

The local motion estimation unit 412 may compare pixel values of blocks of pixels between image frames, such as successive image frames, from the input image signal 430 to determine displacement, or movement, between frames. The local motion estimation unit 412 may produce motion vectors, such as an 'x' component and a 'y' component of motion, at multiple locations within an image frame. The motion vectors may be represented by a translational model or other models that may approximate camera motion, such as rotation and translation in three dimensions, and zooming.

The image signal processor 410 of the image processing and coding pipeline 400 may include an internal electronic storage unit 414, such as shared memory, such as random-access memory (RAM), flash, or other types of memory. The internal electronic storage unit 414 may store local motion estimation information 416 determined by the local motion estimation unit 412 for one or more frames. The local motion estimation information 416 and associated image or images may be output 440 to the encoder 420. In some implementations, the internal electronic storage unit 414 may include a buffer, or cache, and may buffer the input image signal as an input, or source, image, or frame.

The image signal processor 410 may output an image, associated local motion estimation information 416, or both as the output 440. For example, the image signal processor 410 may receive the input image signal 430, process the input image signal 430, and output a processed image as the output 440. Processing the input image signal 430 may include generating and using the local motion estimation information 416, spatiotemporal noise reduction (3DNR), dynamic range enhancement, local tone adjustment, exposure adjustment, contrast adjustment, image stitching, and/or other operations.

The encoder 420 may encode or compress the output 440 of the image signal processor 410. In some implementations, the encoder 420 may implement the one or more encoding standards, which may include motion estimation.

The encoder 420 may output encoded video as an encoded output 450. For example, the encoder 420 may receive the output 440 of the image signal processor 410, which may include processed images, the local motion estimation information 416, or both. The encoder 420 may encode the images and may output the encoded images as the encoded output 450.

The encoder 420 may include a motion estimation unit 422 that may determine motion information for encoding the image output 440 of the image signal processor 410. In some implementations, the encoder 420 may encode the image output 440 of the image signal processor 410 using motion information generated by the motion estimation unit 422 of the encoder 420, the local motion estimation information 416 generated by the local motion estimation unit 412 of the image signal processor 410, or a combination thereof.

For example, the motion estimation unit 422 may determine motion information at pixel block sizes that may differ from pixel block sizes used by the local motion estimation unit 412. In another example, the motion estimation unit 422 of the encoder 420 may generate motion information and the encoder may encode the image output 440 of the image signal processor 410 using the motion information generated by the motion estimation unit 422 of the encoder 420 and the local motion estimation information 416 generated by the local motion estimation unit 412 of the image signal processor 410. In another example, the motion estimation unit 422 of the encoder 420 may use the local motion estimation information 416 generated by the local motion estimation unit 412 of the image signal processor 410 as input for efficiently and accurately generating motion information.

The image signal processor 410, the encoder 420, or both may be distinct units, as shown. For example, the image signal processor 410 may include a motion estimation unit, such as the local motion estimation unit 412 as shown, and/or the encoder 420 may include a motion estimation unit, such as the motion estimation unit 422.

The image signal processor 410 may store motion information, such as the local motion estimation information 416, in a memory, such as the internal electronic storage unit 414, and the encoder 420 may read the motion information from the internal electronic storage unit 414 or otherwise receive the motion information from the image signal processor 410. The encoder 420 may use the motion estimation information determined by the image signal processor 410 for motion compensation processing.

Figure 5:
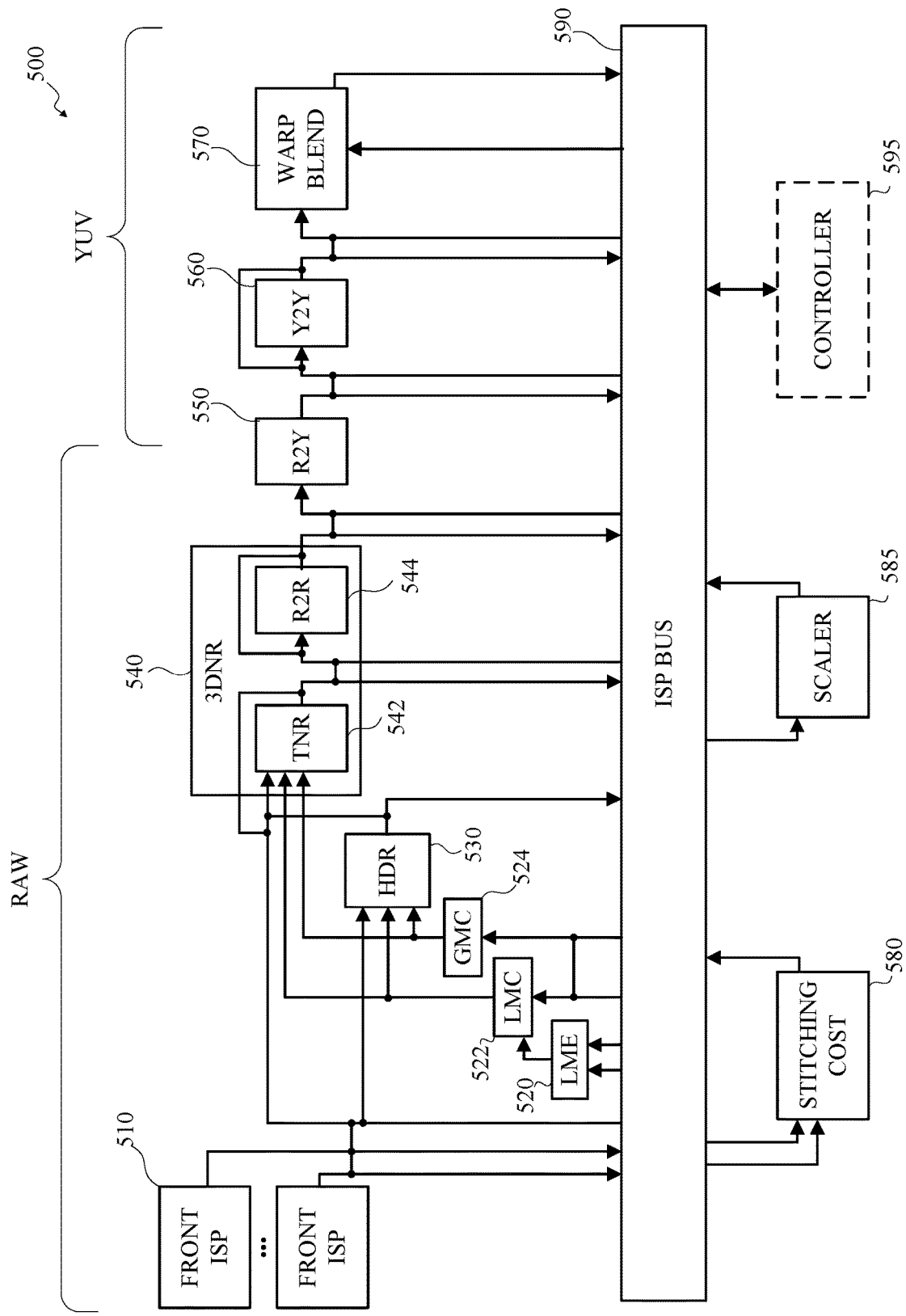
FIG. 5 is a functional block diagram of an example of an image signal processor in accordance with implementations of this disclosure.

FIG. 5 is a functional block diagram of an example of an image signal processor 500 in accordance with implementations of this disclosure. An image signal processor 500 may be included in an image capture device, such as the image capture device 200 shown in FIG. 2, or an image capture apparatus, such as the image capture apparatus 110 shown in FIG. 1 or the image capture apparatus 300 shown in FIG. 3. In some implementations, the image signal processor 500 may be similar to the image signal processor 410 shown in FIG. 4.

The image signal processor 500 may receive an image signal, such as from an image sensor (not shown), such as the image sensor 230 shown in FIG. 2, in a defined format, such as a format of the image sensor, which may be referred to herein as "raw," such as "a raw image," "raw image data," "raw data," "a raw signal," or "a raw image signal." For example, the raw image signal may be in a format such as RGB format, which may represent individual pixels using a combination of values or components, such as a red component (R), a green component (G), and a blue component (B). In another example, the raw image signal may be in a Bayer format, wherein a respective pixel may be one of a combination of adjacent pixels, such as a combination of four adjacent pixels, of a Bayer pattern. For clarity, a sequence of pixels forming a Bayer pattern may be referred to herein as a Bayer. In some implementations, the image signal processor 500 may convert the raw image data (RGB data) to another format, such as a format expressing individual pixels using a combination of values or components, such as a luminance, or luma, value (Y), a blue chrominance, or chroma, value (U or Cb), and a red chroma value (V or Cr), such as the YUV or YCbCr formats.

The image signal processor 500 may include a front image signal processor (Front ISP) 510, or multiple front image signal processors as shown, a local motion estimation (LME) unit 520, a local motion compensation (LMC) unit 522, a global motion compensation (GMC) unit 524, a high dynamic range (HDR) unit 530, a three-dimensional noise reduction (3DNR) unit 540, which may include a temporal noise reduction (TNR) unit 542 and a raw-to-raw (R2R) unit 544, a raw-to-YUV (R2Y) unit 550, a YUV-to-YUV (Y2Y) unit 560, a warp and blend unit 570, a stitching cost unit 580, a scaler 585, an image signal processing bus (ISP BUS) 590, a configuration controller 595, or a combination thereof.

Although not shown expressly in FIG. 5, in some implementations, one or more of the front image signal processor 510, the local motion estimation unit 520, the local motion compensation unit 522, the global motion compensation unit 524, the HDR unit 530, the three-dimensional noise reduction unit 540, the temporal noise reduction unit 542, the raw-to-raw unit 544, the raw-to-YUV unit 550, the YUV-to-YUV unit 560, the warp and blend unit 570, the stitching cost unit 580, the scaler 585, the image signal processing bus 590, the configuration controller 595, or any combination thereof, may include a respective clock, power domain, or both.

The front image signal processor 510 may minimally process image signals received from respective image sensors, which may include image scaling. Scaling, by the front image signal processor 510, may include processing pixels, such as a defined cardinality of pixels, corresponding to a determined quality. For example, the front image signal processor 510 may correct dead pixels, perform band processing, decouple vertical blanking, or a combination thereof In some implementations, the front image signal processor 510 may output a high-resolution frame, one or more downscaled, or reduced, resolution frames, such as a ½×½ resolution frame, a ¼×¼ resolution frame, a ⅛×⅛ resolution frame, a 1/16×1/16 resolution frame, a 1/32×1/32 resolution frame, or any combination thereof A multiple camera apparatus, such as the image capture apparatus 110 shown in FIG. 1, may include multiple image capture devices, such as the image capture device 200 shown in FIG. 2, and may include a respective front image signal processor 510 associated with a respective image capture device.

The local motion estimation unit 520 may receive, or otherwise access, an input frame, or one or more portions thereof, which may be a current input frame, such as via the image signal processor bus 590. In some implementations, the local motion estimation unit 520 may receive the current input frame at a downscaled, or reduced, resolution. In some implementations, such as implementations implementing high dynamic range image processing, the current input frame may be a long exposure input frame.

The local motion estimation unit 520 may receive, or otherwise access, a reference frame, or one or more portions thereof, such as via the image signal processor bus 590. The reference frame may be a previously generated motion compensated prior frame, which may be associated with a temporal location preceding a temporal location associated with the current input frame. For example, the reference frame may be a recirculated frame from the temporal noise reduction unit 542. In some implementations, such as implementations including high dynamic range image processing, the reference frame may be a short exposure input frame corresponding to the long exposure current input frame.

The local motion estimation unit 520 may receive, or otherwise access, previously generated motion information, such as previously generated motion vectors for the current input frame or motion information for a previously processed frame.

The local motion estimation unit 520 may determine motion information, such as motion vectors, representing motion between the current input frame and the reference frame, such as motion caused by moving objects in the field-of-view or non-rotational motion, or translation, of the field-of-view. The local motion estimation unit 520 may output the motion information. For example, the local motion estimation unit 520 may output motion vectors to the local motion compensation unit 522.

The local motion compensation unit 522 may receive, or otherwise access, the reference frame, or one or more portions thereof, such as via the image signal processor bus 590. For example, in some implementations, such as implementations implementing high dynamic range image processing, the reference frame may be the short exposure input frame. In another example, in some implementations implementing high dynamic range image processing, the reference frame may be the long exposure input frame.

The local motion compensation unit 522 may receive, or otherwise access, motion information, such as motion vectors, associated with the current input frame. For example, the local motion compensation unit 522 may receive the motion vectors from the local motion estimation unit 520.

The local motion compensation unit 522 may apply the motion vectors to the reference frame, or one or more portions thereof, which may align, or partially align, the reference frame, or one or more portions thereof, with the current input frame, or one or more portions thereof.

The local motion compensation unit 522 may output a local motion compensated reference frame, or one or more portions thereof.

The global motion compensation unit 524 may receive, or otherwise access, the reference frame, or one or more portions thereof, such as via the image signal processor bus 590. For example, in some implementations, such as implementations implementing high dynamic range image processing, the reference frame may be the short exposure input frame. In another example, in some implementations implementing high dynamic range image processing, the reference frame may be the long exposure input frame.

The global motion compensation unit 524 may receive, or otherwise access, global motion information, such as global motion information from a gyroscopic unit of the image capture apparatus, such as a gyroscopic sensor included in the metadata unit 232 shown in FIG. 2, corresponding to the current input frame. The global motion information may indicate a rotational change in the orientation of the field-of-view relative to the content captured in respective images. For example, the global motion information may indicate a horizontal change of the field-of-view, which may indicate that the corresponding camera panned, or rotated, around a vertical axis. In another example, the global motion information may indicate a vertical change of the field-of-view, which may indicate that the camera tilted or rotated around an axis perpendicular to the lens. In another example, the global motion information may indicate a rotational change of the field-of-view relative to the horizon, which may indicate that the camera rolled or rotated around an axis parallel to the lens. The global motion information may be distinct from motion information, such as translation motion information, indicating a change in the geospatial location of the image capture apparatus, which may include a change associated with changing an elevation of the image capture apparatus. In some embodiments, other changes affecting the frame, such as zooming, may be included as global motion.

The global motion compensation unit 524 may apply the global motion information to the reference frame, or one or more portions thereof, which may align, or partially align, the reference frame, or one or more portions thereof, with the current input frame, or one or more portions thereof.

The global motion compensation unit 524 may output a global motion compensated reference frame, or one or more portions thereof.

The HDR unit 530 may receive, or otherwise access, the current input frame, or one or more portions thereof, such as from the front image signal processor 510. The current input frame may be a long exposure input frame corresponding to the short exposure reference frame. The HDR unit 530 may receive, or otherwise access, the local motion compensated reference frame from the local motion compensation unit 522. The HDR unit 530 may receive, or otherwise access, the global motion compensated reference frame from the global motion compensation unit 524.

The HDR unit 530 may generate a high dynamic range image based on the current input image and the local motion compensated reference frame, the global motion compensated reference frame, or a combination thereof. For example, for a respective portion of the reference frame, such as a respective block, a respective pixel, or a respective Bayer, the temporal noise reduction unit 530 may identify a value for the portion based on the corresponding portion of the local motion compensated reference frame or the corresponding portion of the global motion compensated reference frame.

The HDR unit 530 may output the high dynamic range image. For example, the HDR unit 530 may output the high dynamic range image by storing the high dynamic range image in memory, such as shared memory, via the image signal processor bus 590, or the HDR unit 530 may output the high dynamic range image directly to another unit of the image signal processor 500, such as the temporal noise reduction unit 542.

The HDR unit 530 may be omitted, or high dynamic range processing by the HDR unit 530 may be omitted.

The three-dimensional noise reduction unit 540 may include the temporal noise reduction (TNR) unit 542, the raw-to-raw (R2R) unit 544, or both.

The temporal noise reduction unit 542 may receive the current input frame, or one or more portions thereof, such as from the front image signal processor 510 or via the image signal processor bus 590. In some implementations, such as implementations implementing high dynamic range image processing, the temporal noise reduction unit 542 may receive the high dynamic range input frame, or one or more portions thereof, such as from the HDR unit 530, as the current input frame.

The temporal noise reduction unit 542 may receive, or otherwise access, the local motion compensated reference frame from the local motion compensation unit 522. The temporal noise reduction unit 542 may receive, or otherwise access, the global motion compensated reference frame from the global motion compensation unit 524.

The temporal noise reduction unit 542 may reduce temporal noise in the current input frame, which may include recursively reducing temporal noise in a sequence of input images, such as a video. Recursive temporal noise reduction may include combining a current image with noise feedback information corresponding to a previously processed frame, such as the reference frame, which may be a recirculated frame. For example, the reference frame may be the local motion compensated frame output by the local motion compensation unit 522, the global motion compensated frame output by the global motion compensation unit 524, or a combination thereof. For example, for a respective portion of the reference frame, such as a respective block, a respective pixel, or a respective Bayer, the temporal noise reduction unit 530 may identify a value for the portion based on the corresponding portion of the local motion compensated reference frame or the corresponding portion of the global motion compensated reference frame.

The temporal noise reduction unit 542 may generate output including a pixel value and associated noise variance for the pixel value for one or more pixels of the current input frame.

The raw-to-raw unit 544 may perform spatial denoising of frames of raw images based on noise variance values received from the temporal noise reduction unit 542. For example, spatial denoising in the raw-to-raw unit 544 may include multiple passes of image signal processing, including passes at various resolutions.

The raw-to-YUV unit 550 may demosaic, and/or color process, the frames of raw images, which may include representing respective pixels in the YUV format, which may include a combination of a luminance (Y) component and two chrominance (UV) components.

The YUV-to-YUV unit 560 may perform local tone mapping of YUV images. In some implementations, the YUV-to-YUV unit 560 may include multi-scale local tone mapping using a single pass approach or a multi-pass approach on a frame at different scales.

The warp and blend unit 570 may warp images, blend images, or both. In some implementations, the warp and blend unit 570 may warp a corona around the equator of a respective frame to a rectangle. For example, the warp and blend unit 570 may warp a corona around the equator of a respective frame to a rectangle based on the corresponding low-resolution frame generated by the front image signal processor 510.

The warp and blend unit 570 may apply one or more transformations to the frames. In some implementations, spherical images produced by a multi-face camera device, such as the image capture apparatus 110 shown in FIG. 1 or the image capture apparatus 300 shown in FIG. 3, may be warped and/or blended by the warp and blend unit 570 to correct for distortions at image edges. In some implementations, the warp and blend unit 570 may apply a transformation that is subject to a close to identity constraint, wherein a location of a pixel in an input image to the warp and blend unit 570 may be similar to, such as within a defined distance threshold of, a location of a corresponding pixel in an output image from the warp and blend unit 570. For example, the warp and blend unit 570 may include an internal memory, which may have a size, such as 100 lines, which may be smaller than a size of a frame, and the warp and blend unit 570 may process the input image data in raster-in/raster-out order using a transformation that is subject to a close to identity constraint.

The warp and blend unit 570 may apply a transformation that is independent of close to identity constraints, which may include processing the input image data in raster-in/dynamic-out or dynamic-in/raster-out order. For example, the warp and blend unit 570 may transform two or more non-rectilinear, such as fisheye, images to generate a combined frame, such as an equirectangular frame, by processing the input image data in raster-in/ dynamic-out or dynamic-in/raster-out order.

The stitching cost unit 580 may generate a stitching cost map as an output. In some implementations, the cost map may be represented as a rectangle having disparity (x) and longitude (y) based on a warping. Respective values of the cost map may be a cost function of a disparity (x) value for a corresponding longitude. Cost maps may be generated for various scales, longitudes, and disparities.

The scaler 585 may scale images received from the output of the warp and blend unit 570, which may be in patches, or blocks, of pixels, such as 16×16 blocks, 8×8 blocks, or patches or blocks of any other size or combination of sizes.

The image signal processing bus 590 may be a bus or interconnect, such as an on-chip interconnect or embedded microcontroller bus interface, for communication between the front image signal processor 510, the temporal noise reduction unit 542, the local motion compensation unit 522, the raw-to-raw unit 544, the raw-to-YUV unit 550, the YUV-to-YUV unit 560, the combined warp and blend unit 570, the stitching cost unit 580, the scaler 585, the configuration controller 595, or any combination thereof The configuration controller 595 may coordinate image processing by the front image signal processor 510, the local motion estimation unit 520, the local motion compensation unit 522, the global motion compensation unit 524, the HDR unit 530, the three-dimensional noise reduction unit 540, the temporal noise reduction unit 542, the raw-to-raw unit 544, the raw-to-YUV unit 550, the YUV-to-YUV unit 560, the warp and blend unit 570, the stitching cost unit 580, the scaler 585, the image signal processing bus 590, or any combination thereof, of the image signal processor 500. For example, the configuration controller 595 may control camera alignment model calibration, auto-exposure, auto-white balance, or any other camera calibration or similar process or combination of processes. In some implementations, the configuration controller 595 may be a microcontroller. The configuration controller 595 is shown in FIG. 5 using broken lines to indicate that the configuration controller 595 may be included in the image signal processor 500 or may be external to, and in communication with, the image signal processor 500. The configuration controller 595 may include a respective clock, power domain, or both.

Figure 6:
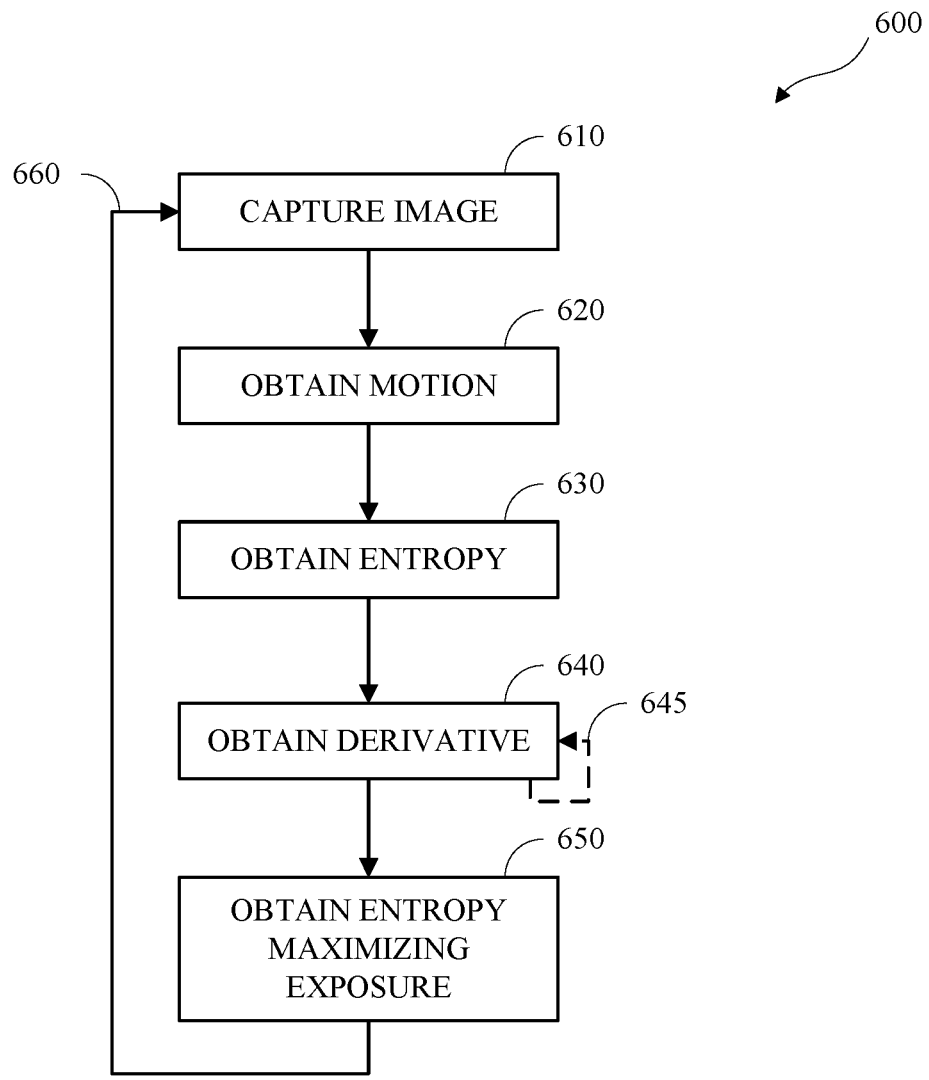
FIG. 6 is a flow diagram of entropy maximization based auto-exposure in accordance with implementations of this disclosure.

FIG. 6 is a flow diagram of entropy maximization based auto-exposure in accordance with implementations of this disclosure. Entropy maximization based auto-exposure 600 may be implemented in an image capture apparatus, such as the image capture apparatus 110 shown in FIG. 1, or the image capture apparatus 300 shown in FIG. 3.

An image sensor of an image capture apparatus may capture an image as a matrix of pixels. Each pixel may be captured, represented, or both, using a defined format, such as a format based on multiple color channels, such as red, green, and blue (RGB), which may correspond with the respective wavelength of detected light. Luminance information may correspond with a cardinality of photons registered by the image sensor for a pixel, or for a color channel thereof. For example, sensor (raw) data captured using a Bayer color filter array includes individual red, blue, and green intensity values that represent the intensity level of the respective color for that pixel. Each pixel, or each color channel thereof, may be represented as a value, such as an integer value, within a defined range (or bit depth), such as 0-4095. For a defined light source, the intensity of light captured by an image sensor is proportional to the exposure interval, and for a defined exposure interval, the intensity of light captured by an image sensor is proportional to the intensity of the light source. Although entropy maximization based auto-exposure is described in the context of a fixed aperture image capture device for simplicity, entropy maximization based auto-exposure may be used in an image capture device using an adjustable aperture.

Capturing an image of a scene using a relatively short exposure interval, such as one millisecond, may include the image sensor registering a relatively small amount of the light (signal) in relation to noise (low signal-to-noise ratio), and the captured image may include noise, such as input noise and quantization noise, or the like, which may reduce image quality.

Capturing an image of a scene using a long exposure interval, relative to illumination conditions, such as one second, may include the image sensor registering a relatively large amount of the light (signal) in relation to noise (high signal-to-noise ratio), and the captured image may include saturated pixels. For example, multiple pixels in a portion of an image may be saturated, each pixel in the saturated portion may be captured at the maximum value, such as 4095, and image detail indicating the relative intensities within the saturated portion may be omitted from the captured image data, which may reduce image quality.

An image may include motion blur, such as motion blur corresponding to movement of the image capture apparatus relative to the captured scene during the exposure interval. For defined motion, the amount of motion blur in an image may be proportional to the exposure interval. For example, the image capture apparatus may move by a cardinality (N) of pixels during the exposure interval and pixel values may be distributed over N pixels.

Noise, saturated pixels, and motion blur may reduce image quality. Increasing the exposure interval may increase the signal-to-noise ratio, reducing noise and improving image quality. Decreasing the exposure interval may reduce or eliminate pixel saturation and motion blur, which may improve image quality. Entropy maximization based auto-exposure 600 may improve image quality by determining an exposure interval that balances the effects of noise, pixel saturation, and motion blur by maximizing image entropy, wherein image entropy indicates an amount of information (information-amount). Image entropy indicates the amount of information captured in an image, which may correspond to a cardinality, quantity, or amount, of data, such as bits, for encoding an image, or a portion of an image.

Entropy maximization based auto-exposure 600 includes determining an exposure interval, which may be a temporal length, time, period, or duration. Determining the exposure interval includes adjusting the exposure interval to maximize image entropy. Entropy maximization based auto-exposure 600 includes capturing an image at 610, obtaining motion data at 620, obtaining entropy data at 630, obtaining derivative entropy data at 640, and obtaining an entropy maximizing exposure interval at 650.

An image may be captured at 610 by the image capture apparatus. Capturing the image may include capturing the image using a previously obtained exposure interval, such as an exposure interval obtained using entropy maximization based auto-exposure 600 for a previously obtained image.

Motion data for the image captured at 610 may be obtained at 620 by the image capture apparatus. For example, motion data for the image captured at 610 may be obtained at 620 based on temporally corresponding motion data from a motion sensor, such as the metadata unit 232 shown in FIG. 2, which may be a gyroscope, of the image capture apparatus during the exposure interval for capturing the image at 610.

Entropy data for the image captured at 610 may be obtained at 630 by the image capture apparatus. The entropy data may include image entropy, which may be a sum of the entropy of each pixel in the image (pixel entropy data). The entropy for a pixel (pixel entropy value) may be determined based on a signal-to-noise ratio for the pixel, pixel saturation, and motion blur.

A signal level entropy ($S_{SNR}$) for a pixel may be determined as the base two logarithm of the signal-to-noise ratio (SNR) for the pixel, which may be expressed as log2(SNR). For example, a pixel having a signal-to-noise ratio of 100 may be encoded using seven bits. The signal-to-noise ratio is a metric of effectively random variation of captured image data (noise) to the signal (light) captured, which is proportional to exposure interval, and is a measure of the sensitivity of the image capture apparatus. The signal is the value of the pixel, such as a value in the defined range, such as 0-4095. The noise is a sum of a noise model of the sensor as a function of the pixel value and the quantization noise. For example, a and b may be defined values, such as constants, which may be defined for the image capture apparatus, and the noise model for a pixel having the value x may be expressed as sqrt(ax+b). The standard deviation of the quantization noise may be expressed as sqrt(1/12).

The signal level entropy ($S_{SNR}$) for a pixel may be adjusted based on the amount of motion blur (b). Motion blur may cause the information from a point in the image to be distributed among multiple pixels, which may have equivalent values, such that each pixel represents a fraction of the information. The amount of motion blur (b) may be determined based on the motion data identified at 620, the exposure interval used for capturing the image at 610, and the size of the pixel. The entropy (motion blur adjusted value) for a pixel adjusted based on the amount of motion blur (b) may be determined by dividing the signal level entropy ($S_{SNR}$) by the sum of the pixel size and the amount of motion blur (b). For simplicity and clarity, the pixel size may be expressed as a unit size of one, and determining the entropy (motion blur adjusted value) for a pixel adjusted based on the amount of motion blur (b) may be expressed as $S_{SNR}/1+b$.

An entropy of zero may be used for a saturated pixel, which may represent the uncertainty of the relative intensities within the saturated portion.

In some implementations, the amount of motion blur (b), which may be field variable, may be approximated to be a constant value, the pixel level adjustment of entropy may be omitted, and the image entropy may be adjusted using an image level motion blur adjustment, wherein the entropy for a pixel may be determined based on a histogram of the image.

In some implementations, using an entropy of zero for a saturated pixel may be omitted for some pixels, such as based on a determination of an effect on image quality, and another defined value, such as a positive or negative constant, may be used.

In some implementations, determining the entropy for a pixel may include obtaining a saliency map indicating a relative importance of respective areas, or pixels, within the image, and a saliency adjusted entropy, which may be a product of multiplying a saliency value for the pixel by the entropy of the pixel, may be used as the entropy of the pixel.

In some implementations, such as implementations including spatial image merging along a stitch line, saturated pixels along the stitch line may be weighted such that saturated pixels along the stitch line are minimized.

In some implementations, entropy maximization based auto-exposure 600 may be adjusted based on a denoising algorithm.

Derivative entropy data for the image captured at 610 may be obtained at 640 by the image capture apparatus. Obtaining the derivative entropy data may include determining entropy data for the first image corresponding to adjusting, such as increasing or decreasing, the exposure interval by a candidate exposure adjustment, such as one millisecond. Derivative entropy data may be obtained for multiple candidate exposure adjustments as indicated by the broken line at 645. For example, derivative entropy data may be obtained for candidate exposure adjustments in a sequence, such as decrease one millisecond, increase one millisecond, decrease two milliseconds, increase two milliseconds, decrease three milliseconds, and increase thee milliseconds. Other exposure adjustments, or sequences or patterns thereof, may be used.

An entropy maximizing exposure interval may be obtained at 650 by the image capture apparatus. The entropy maximizing exposure interval may be obtained based on a sum of the exposure interval used for capturing the image at 610 and the exposure adjustment corresponding to the maximum derivative entropy obtained at 640. In some implementations, the exposure interval used for capturing the image at 610 may maximize the image entropy and the entropy maximizing exposure interval may be the exposure interval used for capturing the image at 610.

In some embodiments, obtaining the entropy maximizing exposure interval at 650 may include obtaining an entropy maximizing gain, which may be the gain used for capturing a subsequent image.

The image capture apparatus may capture a subsequent image, as indicated by the line at 660, using the entropy maximizing exposure interval obtained at 650.

Where certain elements of these implementations may be partially or fully implemented using known components, only those portions of such known components that are necessary for an understanding of this disclosure have been described. Detailed descriptions of other portions of such known components have been omitted so as not to obscure the disclosure. The drawings are for the purpose of illustration and description only and are not intended as a definition of the limits of the disclosure.

As used in the specification and in the claims, the singular form of "a," "an," and "the" include plural referents unless the context clearly dictates otherwise.

An implementation showing a singular component in this disclosure should not be considered limiting; rather, this disclosure is intended to encompass other implementations including a plurality of the same component, and vice-versa, unless explicitly stated otherwise herein. Further, this disclosure encompasses present and future known equivalents to the components referred to herein by way of illustration.

As used herein, the term "bus" is meant generally to denote all types of interconnection or communication architecture that may be used to communicate data between two or more entities. The "bus" could be optical, wireless, infrared or another type of communication medium. The exact topology of the bus could be for example standard "bus," hierarchical bus, network-on-chip, address-event-representation (AER) connection, or other type of communication topology used for accessing, e.g., different memories in a system.

As used herein, the term "computing device" is meant to include personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), as well as object-oriented environments such as the Common Object Request Broker Architecture (CORBA), Java™ (including J2ME, Java Beans), Binary Runtime Environment (e.g., BREW).

As used herein, the terms "connection," "link," "transmission channel," "delay line," and "wireless" mean a causal link between any two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include field programmable gate arrays (FPGAs), programmable logic devices (PLDs), reconfigurable computer fabrics (RCFs), SoCs, application-specific integrated circuits (ASICs), and/or other types of integrated circuits.

As used herein, the term "memory" includes any type of integrated circuit or other storage device adapted for storing digital data including, without limitation, ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "processor," "microprocessor," and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., FPGAs), PLDs, RCFs, array processors, secure microprocessors, ASICs, and/or other digital processing devices. Such digital processors may be contained on a single unitary IC die, or distributed across multiple components.

As used herein, the terms "network interface" and "communications interface" refer to any signal, data, and/or software interface with a component, network, and/or process. By way of non-limiting example, a communications interface may include one or more of FireWire (e.g., FW400, FW110, and/or other variation.), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or OOB, cable modem, and/or other protocol), Wi-Fi (802.11), WiMAX (802.16), PAN (e.g., 802.15), cellular (e.g., 3G, LTE/LTE-A/TD-LTE, GSM, and/or other cellular technology), IrDA families, and/or other communications interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

As used herein, the terms "imaging device" and "camera" may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While certain aspects of the implementations described herein are in terms of a specific sequence of steps of a method, these descriptions are only illustrative of the broader methods of the disclosure and may be modified as required by the particular applications thereof. Certain steps may be rendered unnecessary or optional under certain circumstances. Additionally, certain steps or functionality may be added to the disclosed implementations, or the order of performance of two or more steps permuted. All such variations are considered to be encompassed within the disclosure.

While the above detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technologies.

What is claimed is:

1. An image capture apparatus comprising:
an image sensor;
a motion sensor; and
an auto-exposure unit configured to:
   obtain, from the image sensor, an input image signal representing an input image captured during an exposure interval;
   obtain, from the motion sensor, motion data indicating motion of the image capture apparatus during the exposure interval;
   obtain image information-amount data for the input image, wherein the image information-amount data is a sum of pixel information-amount data, wherein, for each pixel, the pixel information-amount data is obtained by:
      in response to a determination that an input value for the pixel is a maximum pixel value, using zero as an information-amount value for the pixel; and
      in response to a determination that the input value for the pixel is within the maximum pixel value:
         obtaining a signal level information-amount for the pixel as the base two logarithm of a signal-to-noise ratio for the pixel, wherein the signal-to-noise ratio is a ratio of the input value to a noise value for the pixel, and wherein the noise value for the pixel is modeled as a square root of a sum of a first defined value and a product of a second defined value and the input value of the pixel; and
         using a motion blur adjusted value for the pixel as the information- amount value for the pixel, wherein the motion blur adjusted value for the pixel is obtained based on the signal level information-amount for the pixel and the motion data;
   obtain derivative information-amount data based on the information-amount data and a candidate exposure adjustment; and
   obtain an information-amount maximizing exposure interval based on the information-amount data and the derivative information-amount data, wherein the image capture apparatus is configured to control the image sensor to obtain a subsequent input image signal representing a subsequent input image captured during the information- amount maximizing exposure interval, and output or store information representing the subsequent input image.

2. An image capture apparatus comprising:
an image sensor configured to capture an input image in accordance with an exposure interval;
a motion sensor configured to capture temporally corresponding motion data indicating motion of the image capture apparatus in accordance with the exposure interval; and
an auto-exposure unit configured to:
   obtain, from the image sensor, an input image signal representing the input image;
   obtain, from the motion sensor, the temporally corresponding motion data;
   obtain image information-amount data for the input image based on the temporally corresponding motion data;
   obtain derivative information-amount data based on the information-amount data and a candidate exposure adjustment; and
   obtain an information-amount maximizing exposure interval based on the information-amount data and the derivative information-amount data.

3. The image capture apparatus of claim 2, wherein:
the input image includes pixels; and
the auto-exposure unit is configured to:
   obtain pixel information-amount data for the pixels; and
   obtain a sum of the pixel information-amount data as the image information- amount data.

4. The image capture apparatus of claim 3, wherein the auto-exposure unit is configured to obtain the pixel information-amount data by:
for each pixel from the pixels:
determining a pixel information-amount value for the pixel based on a signal-to-noise ratio for the pixel, pixel saturation, and motion blur.

5. The image capture apparatus of claim 4, wherein the auto-exposure unit is configured to determine the respective pixel information-amount value by:
in response to a determination that an input value for the pixel is a maximum pixel value, using a defined value as the pixel information-amount value for the pixel; and
in response to a determination that the input value for the pixel is less than the maximum pixel value:
obtaining a signal level information-amount for the pixel as the base two logarithm of a signal-to-noise ratio for the pixel, wherein the signal-to-noise ratio is a ratio of the input value to a noise value for the pixel, and wherein the noise value for the pixel is modeled as a square root of a sum of a first defined value and a product of a second defined value and the input value of the pixel; and
using a motion blur adjusted value for the pixel as the pixel information-amount value for the pixel.

6. The image capture apparatus of claim 5, wherein the defined value is zero.

7. The image capture apparatus of claim 6, wherein the auto-exposure unit is configured to obtain the motion blur adjusted value for the pixel by:
determining an amount of motion blur based on the temporally corresponding motion data, the exposure interval, and a size of the pixel; and
using, as the motion blur adjusted value, a result of dividing the signal level information- amount by a sum of the size of the pixel and the amount of motion blur.

8. The image capture apparatus of claim 3, wherein the auto-exposure unit is configured to obtain the pixel information-amount data by:
for each pixel from the pixels:
determining a pixel information-amount value for the pixel based on a histogram of the input image.

9. The image capture apparatus of claim 8, wherein the auto-exposure unit is configured to obtain the pixel information-amount data by:
obtaining a saliency map indicating a relative importance of respective pixels within the input image; and
for each pixel from the pixels:
determining a saliency adjusted information-amount by multiplying a saliency value from the saliency map for the pixel by the pixel information-amount value; and
using the saliency adjusted information-amount as the pixel information-amount value.

10. The image capture apparatus of claim 9, wherein the auto-exposure unit is configured to obtain the pixel information-amount data by:
in response to a determination that a pixel is a saturated pixel along a stitch line for image merging, weighting the pixel to minimize saturated pixels along the stitch line.

11. The image capture apparatus of claim 10, wherein the image sensor is configured to capture a second input image in accordance with the information-amount maximizing exposure interval.

12. A method comprising:
performing, by an auto-exposure unit of an image capture apparatus, information-amount maximization based auto-exposure, wherein information-amount maximization based auto-exposure includes:
obtaining, from an image sensor of the image capture apparatus, an input image signal representing an input image captured in accordance with an exposure interval;
obtaining, from a motion sensor of the image capture apparatus, temporally corresponding motion data indicating motion of the image capture apparatus in accordance with the exposure interval;
obtaining image information-amount data for the input image based on the temporally corresponding motion data;
obtaining derivative information-amount data based on the information-amount data and a candidate exposure adjustment; and
obtaining an information-amount maximizing exposure interval based on the information-amount data and the derivative information-amount data.

13. The method of claim 12, wherein the input image includes pixels, and wherein information-amount maximization based auto-exposure includes:
obtaining pixel information-amount data for the pixels; and
obtaining a sum of the pixel information-amount data as the image information-amount data.

14. The method of claim 13, wherein obtaining the pixel information-amount data includes:
for each pixel from the pixels:
determining a respective pixel information-amount value for the pixel based on a signal-to-noise ratio for the pixel, pixel saturation, and motion blur.

15. The method of claim 14, wherein determining the respective pixel information-amount value includes:
in response to a determination that an input value for the pixel is a maximum pixel value, using a defined value as the pixel information-amount value for the pixel; and
in response to a determination that the input value for the pixel is less than the maximum pixel value:
obtaining a signal level information-amount for the pixel as the base two logarithm of a signal-to-noise ratio for the pixel, wherein the signal-to-noise ratio is a ratio of the input value to a noise value for the pixel, and wherein the noise value for the pixel is modeled as a square root of a sum of a first defined value and a product of a second defined value and the input value of the pixel; and
using a motion blur adjusted value for the pixel as the pixel information-amount value for the pixel.

16. The method of claim 15, wherein obtaining the motion blur adjusted value for the pixel includes:
determining an amount of motion blur based on the temporally corresponding motion data, the exposure interval, and a size of the pixel; and
using, as the motion blur adjusted value, a result of dividing the signal level information-amount by a sum of the size of the pixel and the amount of motion blur.

17. The method of claim 13, wherein obtaining the pixel information-amount data includes:
for each pixel from the pixels:
determining a pixel information-amount value for the pixel based on a histogram of the input image.

18. The method of claim 17, wherein obtaining the pixel information-amount data includes:
 obtaining a saliency map indicating a relative importance of respective pixels within the input image; and
 for each pixel from the pixels:
  determining a saliency adjusted information-amount by multiplying a saliency value from the saliency map for the pixel by the pixel information-amount value; and
  using the saliency adjusted information-amount as the pixel information-amount value.

19. The method of claim 18, wherein obtaining the pixel information-amount data includes:
 in response to a determination that a pixel is a saturated pixel along a stitch line for image merging, weighting the pixel to minimize saturated pixels along the stitch line.

20. The method of claim 19, wherein information-amount maximization based auto-exposure includes obtaining, by the image sensor, a second input image signal representing a second input image in accordance with the information-amount maximizing exposure interval.

* * * * *